United States Patent
Wiegers et al.

(10) Patent No.: US 11,161,616 B2
(45) Date of Patent: Nov. 2, 2021

(54) HIGH EFFICIENCY PNEUMATIC FLOW CONTROL SYSTEM FOR AIRCRAFT

(71) Applicant: Textron Aviation Inc., Wichita, KS (US)

(72) Inventors: Robert Glynn Wiegers, Wichita, KS (US); Leland Merle Peterson, El Dorado, KS (US)

(73) Assignee: Textron Innovations, Inc., Providence, RI (US)

( * ) Notice: Subject to any disclaimer, the term of this patent is extended or adjusted under 35 U.S.C. 154(b) by 330 days.

(21) Appl. No.: 15/956,201

(22) Filed: Apr. 18, 2018

(65) Prior Publication Data

US 2018/0312262 A1 Nov. 1, 2018

Related U.S. Application Data

(60) Provisional application No. 62/490,938, filed on Apr. 27, 2017.

(51) Int. Cl.
| | |
|---|---|
| *B64D 13/06* | (2006.01) |
| *F04F 5/48* | (2006.01) |
| *F04F 5/16* | (2006.01) |
| *B64D 13/04* | (2006.01) |

(52) U.S. Cl.
CPC ............. *B64D 13/06* (2013.01); *B64D 13/04* (2013.01); *F04F 5/16* (2013.01); *F04F 5/48* (2013.01); *B64D 2013/0618* (2013.01)

(58) Field of Classification Search
CPC .................. B64D 13/06; B64D 2013/0618
See application file for complete search history.

(56) References Cited

U.S. PATENT DOCUMENTS

| | | | | |
|---|---|---|---|---|
| 3,367,256 A | * | 2/1968 | Townsend | B64D 13/02 454/73 |
| 3,441,045 A | * | 4/1969 | Malone | B64D 13/00 137/114 |
| 3,842,720 A | | 10/1974 | Herr | |
| 4,285,466 A | * | 8/1981 | Linscheid | G05D 23/1393 165/298 |
| 4,966,005 A | * | 10/1990 | Cowell | B64D 13/06 62/172 |
| 8,099,973 B2 | | 1/2012 | Sampson et al. | |
| 8,733,110 B2 | | 5/2014 | Weber et al. | |
| 8,985,966 B2 | | 3/2015 | Sampson et al. | |
| 9,580,180 B2 | | 2/2017 | Jonqueres et al. | |
| 2008/0115503 A1 | | 5/2008 | Vasquez et al. | |
| 2012/0180509 A1 | * | 7/2012 | DeFrancesco | B64D 13/06 62/172 |
| 2013/0269374 A1 | * | 10/2013 | Kelnhofer | B64D 13/06 62/89 |

(Continued)

*Primary Examiner* — Richard R. Green
*Assistant Examiner* — William L Gmoser
(74) *Attorney, Agent, or Firm* — Erise IP, P.A.

(57) ABSTRACT

A pneumatic flow-control system and method for an aircraft provide efficient mixing of high-pressure engine bleed air with one or both of low-pressure engine bleed air and ambient air. A controller determines an amount of high- and low-pressure air and ambient air to provide based on ambient air temperature and pressure and a flow rate and temperature of the mixed air for improving engine performance during different phases of flight and for reducing a burden on an environmental control subsystem of the aircraft.

17 Claims, 5 Drawing Sheets

(56) References Cited

U.S. PATENT DOCUMENTS

| | | | |
|---|---|---|---|
| 2017/0152050 A1* | 6/2017 | Klimpel | B64D 13/06 |
| 2017/0160180 A1* | 6/2017 | Bezold | B64D 13/08 |
| 2017/0203845 A1* | 7/2017 | Army | F25B 9/004 |
| 2017/0283076 A1* | 10/2017 | Herchenroder | B64D 13/06 |
| 2018/0057170 A1* | 3/2018 | Sautron | F02C 7/185 |
| 2018/0057171 A1* | 3/2018 | Sautron | F02C 9/18 |
| 2018/0057172 A1* | 3/2018 | Sautron | F02C 9/18 |
| 2018/0073431 A1* | 3/2018 | Smith | B64D 13/02 |
| 2018/0237144 A1* | 8/2018 | Bruno | B64D 13/06 |
| 2018/0297709 A1* | 10/2018 | Bruno | B64D 13/02 |
| 2019/0003382 A1* | 1/2019 | Schwarz | F01D 21/02 |

* cited by examiner

HIGH EFFICIENCY PNEUMATIC FLOW CONTROL SYSTEM FOR AIRCRAFT

CROSS-REFERENCE TO RELATED APPLICATIONS

This application claims the benefit of U.S. Provisional Patent Application Ser. No. 62/490,938 entitled High Efficiency Pneumatic Flow Control System for Aircraft and filed Apr. 27, 2017, the disclosure of which is herein incorporated by reference in its entirety.

BACKGROUND

1. Field

Embodiments of this disclosure relate generally to the field of aircraft environmental control systems, and more specifically to systems for delivering air from a jet engine to an environmental control system for providing cabin air pressure and temperature.

2. Description of the Related Art

Aircraft require environmental control of the cockpit and cabin to provide habitable pressure, temperature and ventilation. As part of reaching these objectives, bleed air is typically extracted from the engine and provided to an environmental control system.

Environmental control systems using engine bleed air have been provided in a variety of ways in prior aircraft. For example, U.S. Pat. No. 8,985,966 to Sampson et al. discloses a jet pump apparatus that uses a multi-channel jet pump to mix flow of high pressure bleed air and low-pressure bleed air, including ambient air. U.S. Patent Publication 2008/0115503 to Vasquez discloses a multi-port bleed system for selectively supplying bleed air from one or more compressor stages to a variable geometry ejector pump. U.S. Pat. No. 8,099,973 to Sampson et al. discloses an environmental control system that uses high pressure bleed air and recirculated cabin air. U.S. Pat. No. 9,580,180 to Jonqueres et al. discloses a low-pressure air aircraft environmental control system that uses a bypass valve to allow bleed air to bypass an air cycle machine. U.S. Pat. No. 3,842,720 to Herr discloses a jet pump for an aircraft cabin pressurization system that uses a jet pump to mix high pressure bleed air with ambient air. U.S. Pat. No. 8,733,110 to Weber et al. discloses a method and systems for bleed air supply that includes an integrated ejector valve assembly that controls the flow of air through multiple ports.

SUMMARY

In an embodiment, a pneumatic flow-control system for an aircraft is provided. The system includes an ambient-air inlet for providing ambient air from outside the aircraft, a low-pressure source of engine bleed air from a low-compression stage of an engine for providing low-pressure-bleed air, and a selector valve for selecting ambient air or low-pressure-bleed air to provide low-pressure air. The system further includes a high-pressure source of engine bleed air from a high-compression stage of the aircraft engine for providing high-pressure-bleed air, and a jet pump having a primary inlet for receiving high-pressure-bleed air from the high-pressure source and a secondary inlet for receiving low-pressure air from the selector valve. The jet pump is adapted to mix high-pressure bleed air with low-pressure air for providing a mixed air to an environmental control subsystem.

In another embodiment, a pneumatic flow control method is provided. The method includes providing a high-pressure bleed air from a high-compression stage of an aircraft engine to a jet pump and measuring an ambient air pressure. When the ambient air pressure meets a predetermined threshold pressure, an ambient air is delivered via an inlet of an aircraft to provide a low-pressure air to the jet pump. When the ambient air pressure does not meet the predetermined threshold pressure, a low-pressure bleed air is delivered from a low-compression stage of the aircraft engine to provide the low-pressure air to the jet pump. The method further includes mixing, with the jet pump, the high-pressure bleed air with the low-pressure air to provide a mixed air, measuring, with a flow sensor, a flow rate of the mixed air exiting the jet pump, and providing the mixed air to an environmental control subsystem of the aircraft.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

DETAILED DESCRIPTION

Aircraft require that the cabin be ventilated, temperature controlled, and pressurized to maintain a habitable environment for the passengers and crew. Bleed air may be extracted from one or more of the engine's compressor stages to provide a source of high temperature and high-pressure air. Based on the compressor stages used, a range of available bleed air pressures and temperatures may be provided depending on engine power and ambient air conditions. However, turboprop and turbofan engines are typically unable to produce substantial bleed air, making methods to efficiently use bleed air critical to their success.

Typical bleed air extraction varies with pressure/altitude changes which requires excess bleed air extraction at cruise altitude. This results in an increase in fuel burn, a decreased in available thrust, and an increased cooling capacity of the aircraft's environmental control subsystem. Blending hot, high-pressure bleed air with cooler, lower-pressure air may be used to help reduce the bleed-air temperature while maintaining the same cabin inflow rate. If ambient air is used to provide the lower-pressure air, takeoff performance is improved by reducing high-pressure bleed air extraction, but due to a decrease in ambient pressure at cruise altitude, additional higher-pressure bleed air is required reducing aircraft range. If lower-pressure bleed air from the engine is used instead of ambient air, cruise performance is improved by reducing high-pressure bleed air extraction, but takeoff performance is reduced due to additional bleed-air flow required at sea level.

Embodiments of the present disclosure overcome these drawbacks by providing a system and method for efficiently distributing high- and low-pressure engine bleed air with ambient air based on different ambient air pressures for improving performance during different phases of a flight profile and reducing an environmental control burden.

Figure 1:
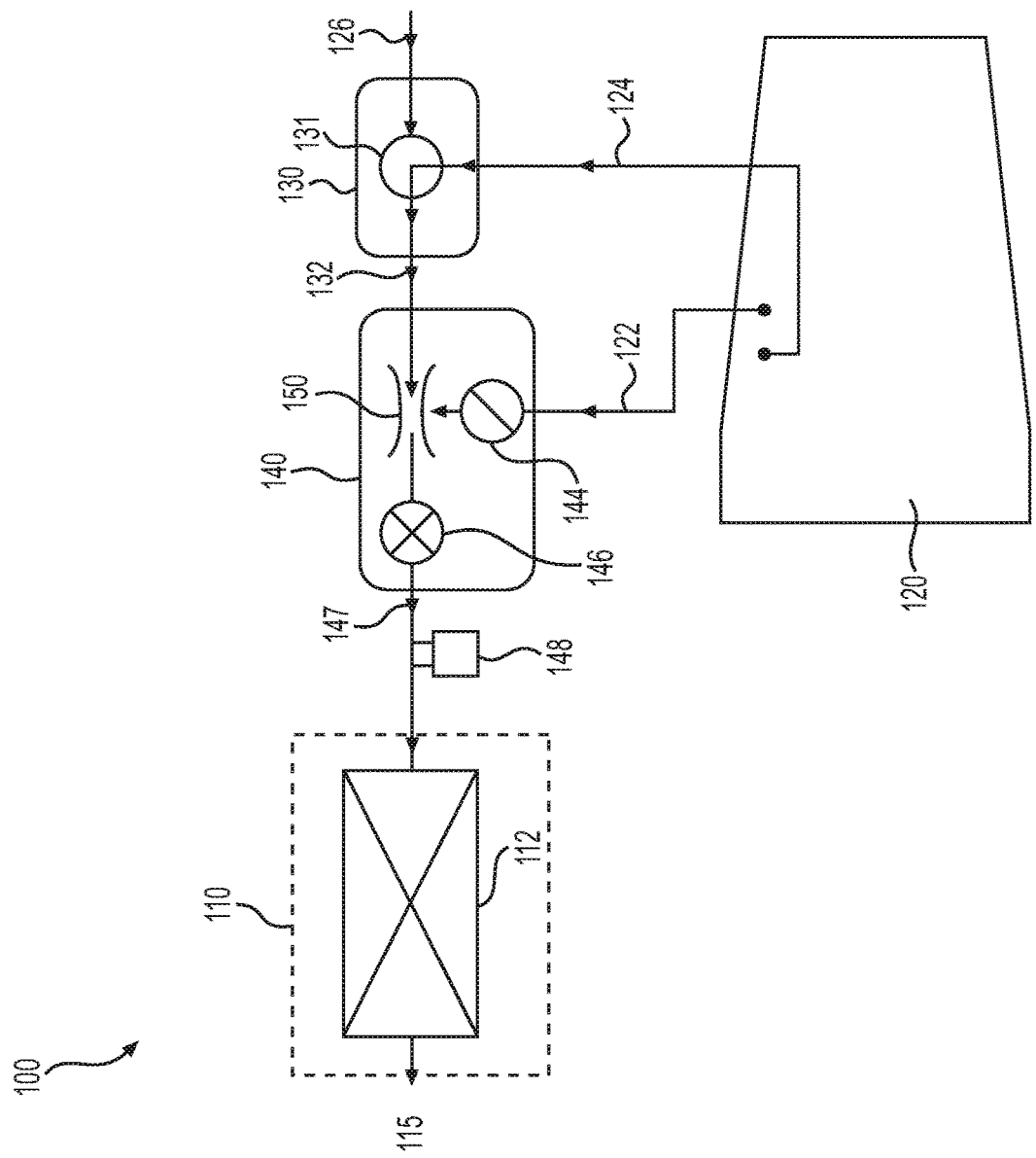
FIG. 1 is a diagram showing one embodiment of a high efficiency pneumatic flow control system for aircraft.

FIG. 1 shows a high efficiency pneumatic flow control system 100. Air from system 100 is directed to an Environmental Control System (ECS) 110, which regulates pressure, flow rate and temperature of a cabin air supply 115 provided to the aircraft cabin for heating, cooling, ventilation and pressurization. Cabin air supply 115 is temperature controlled via ECS 110, which includes a heat exchanger 112 for removing heat.

Air provided to ECS 110 originates from three sources: the first two are supplied by an engine 120, namely high-pressure (HP) bleed air 122 and low-pressure (LP) bleed air 124. LP bleed air typically has a gauge pressure between about 40-psig to about 120-psig, and HP bleed air typically has as a gauge pressure between about 90-psig to about 300-psig. However, these pressure ranges are exemplary only since engine bleed air pressures may vary considerably based on engine design, ambient conditions, and power settings. The third source of air is ambient air 126 supplied from the ambient environment (e.g., via an aerodynamic inlet). Therefore, embodiments of the present disclosure may be used with any gas-turbine engine having more than one compression stage available for bleed-air extraction (e.g., having more than one engine port for bleed air).

Pressure and temperature of HP bleed air 122 and LP bleed air 124 depend upon factors such as the engine compression ratio, which compression stages are available for bleed air extraction, the selected engine power setting, and the ambient air conditions. An increase in extraction of HP bleed air 122 increases engine fuel burn, which decreases engine thrust and aircraft range, and increases the amount of cooling required by ECS 110. Ambient air pressure (e.g., static or dynamic ambient air pressure) depends on, for example, a ram recovery of the aerodynamic inlet and aircraft altitude.

LP bleed air 124 and ambient air 126 are supplied to a mix-source select valve (MSSV) 130. MSSV 130 is used to supply either LP bleed air 124 or ambient air 126 to a flow control valve 140. In system 100, MSSV 130 includes a three-way selector valve 131. In an alternative embodiment, described below in connection with FIG. 2, the MSSV includes a combination of a check valve 133 and a modulating valve 135.

Returning to FIG. 1, three-way selector valve 131 of MSSV 130 has a first inlet for LP bleed air, a second inlet for ambient air, and an outlet. Three-way selector valve 131 may include a modulating gate or ball valve for sourcing low-pressure air by switching between the first and second inlets. Alternatively, three-way selector valve 131 may be used to blend sources of air between the first and second inlets. Additionally, a venturi ejector may be used for enhancing mixing of air sources. Switching and blending inlet air sources depends on ambient air pressure, which may be measured (e.g., via the aircraft's static ports) or estimated from standard atmospheric lookup tables based on altitude (e.g., via controller 410, FIG. 4). Three-way selector valve 131 may be actuated using, for example, an electric motor or a pneumatic-torque motor, which may be under control of a controller, such as controller 410 described below in connection with FIG. 4. Three-way selector valve 131 is used to control the outlet flow rate from MSSV 130 regardless of the input source (e.g., LP bleed air 124 or ambient air 126).

Figure 2:
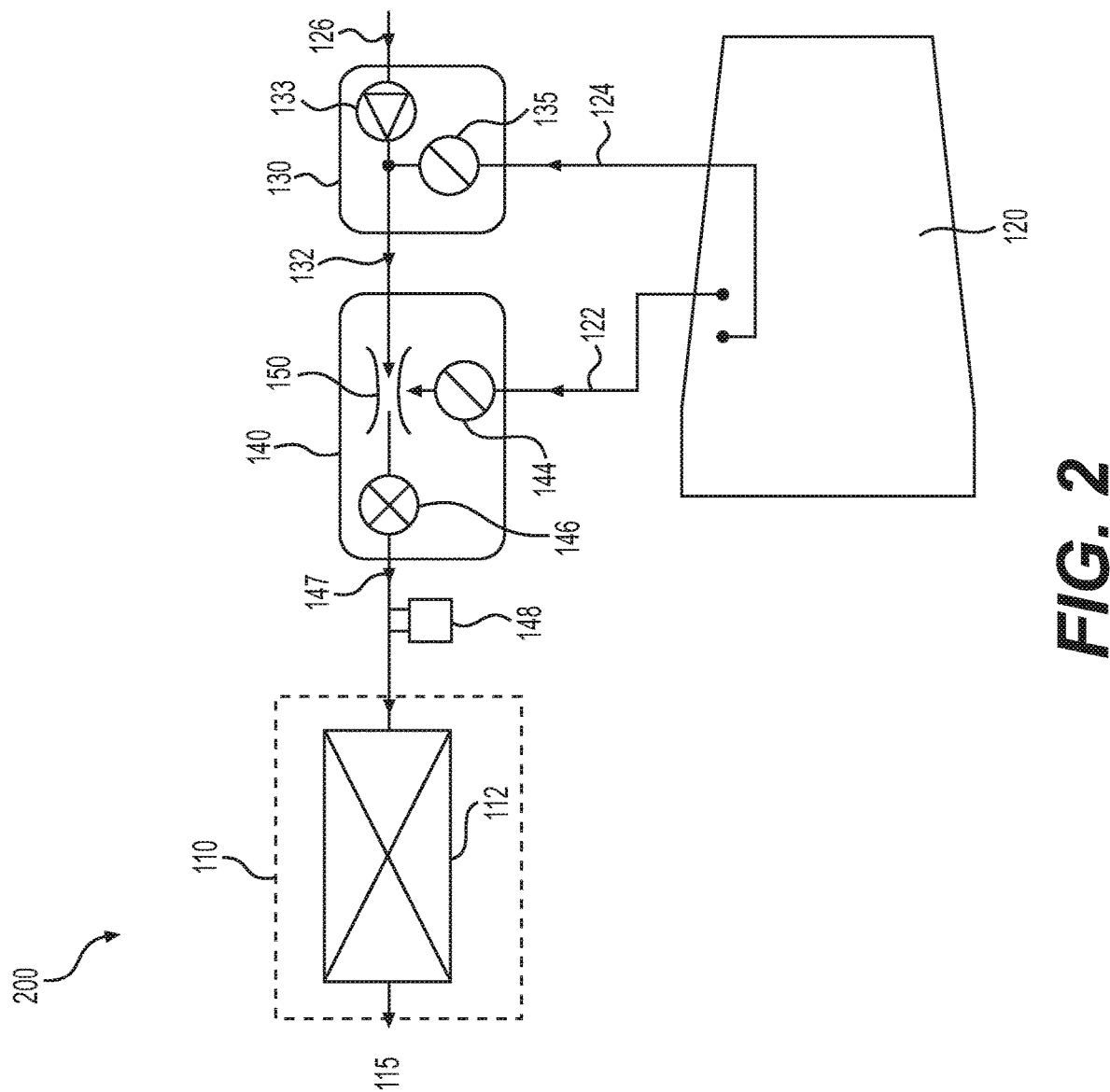
FIG. 2 is a diagram showing another embodiment of a high efficiency pneumatic flow control system for aircraft.

FIG. 2 shows a high efficiency pneumatic flow control system 200, which is an example of system 100, FIG. 1. In system 200, MSSV 130 includes a modulating valve 135 in combination with a check valve 133 for switching between LP bleed air and ambient air. For example, check valve 133 may include a dual-petal check valve to control the ambient air inlet 126, and modulating valve 135 may include a butterfly valve actuated with an electric motor or a pneumatic torque motor to control the LP bleed air 124. When modulating valve 135 is closed, ambient air flows through check valve 133. If the ambient air pressure is below a predetermined threshold, check valve 133 remains closed and modulating valve 135 is opened to allow flow of LP bleed air 124. The modulating/check valve combination of system 200 may be used to control the outlet flow rate from MSSV 130. This control may be provided via a controller, such as controller 410 described below in connection with FIG. 4, based on a measured ambient air pressure.

In systems 100 and 200 of FIGS. 1 and 2, respectively, HP bleed air 122 and MSSV outlet air 132 are supplied to flow control valve (FCV) 140. FCV 140 uses a jet pump 150 to mix two sources of air (e.g., HP bleed air 122 with MSSV outlet air 132), as further described below in connection with FIG. 3. FCV 140 may include a modulating valve 144 configured to vary the quantity of HP bleed air provided to jet pump 150. In contrast, all the flow may pass from the MSSV outlet to jet pump 150 since the MSSV may be configured to control its own outlet flow. FCV 140 mixes HP bleed air 122 and MSSV outlet air 132 using jet pump 150 to generate a desired flow rate and pressure, preferably at the lowest possible temperature, based on the engine power setting and ambient conditions. FCV 140 may include an independent shutoff function 146 (e.g., a shutoff valve) for shutting off flow from FCV 140. Control of modulating valve 144 and shutoff function 146 may be performed using a controller, such as controller 410 described below in connection with FIG. 4

Outlet flow 147 from FCV 140 may be continually monitored using a flow sensor 148 installed downstream (e.g., in the ducting) of FCV 140. Exemplary flow sensors may include a hot-wire anemometer, venturi-type sensor, or other type of flow-rate measuring device without departing from the scope hereof. Information from flow sensor 148 may be provided to a controller, such as controller 410 described below in connection with FIG. 4, for controlling modulating valve 144 and modulating valve 135 or three-way selector valve 131, FIG. 1, thereby providing a desired flow rate of outlet air 147.

Figure 3:
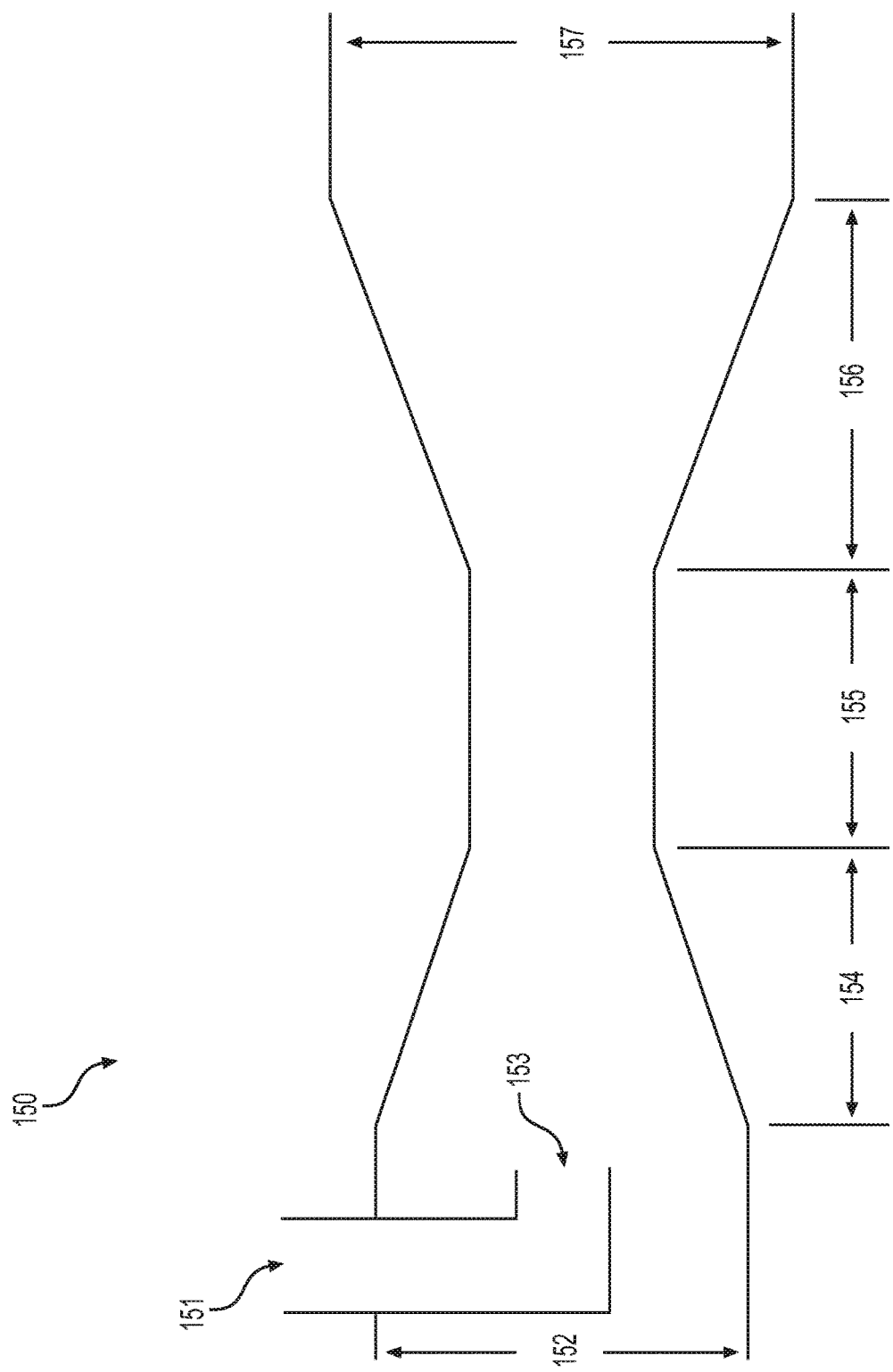
FIG. 3 is a diagram of a jet pump used in certain embodiments with the high efficiency pneumatic flow control systems of FIGS. 1 and 2.

FIG. 3 shows an exemplary jet pump 150 used in FCV 140 of FIGS. 1 and 2. Jet pump 150 includes a primary inlet 151 and a secondary inlet 152, a primary flow nozzle 153, a contraction tube 154, a mixing tube 155, a diffusing tube 156, and a combined flow outlet 157. Primary inlet 151 and secondary inlet 152 supply HP bleed air 122 and MSSV outlet air 147, respectively. A primary flow (e.g., HP bleed air 122) enters jet pump 150 through primary flow nozzle 153 at a high velocity and energy, which mixes with a secondary flow (e.g., MSSV outlet air 147) of lower velocity and energy, generating viscous shear and fluid diffusion. Primary flow nozzle 153 may include an upstream variable diameter orifice, which may take the form of a butterfly, ball, or gate-type modulating valve, for throttling primary flow (e.g., controlling primary flow velocity) under control of a controller (e.g., a controller 410, FIG. 4). This process results in a homogenous, single stream flow of outlet air 147 at a pressure and temperature between that of high-pressure air from primary inlet 151 and low-pressure air from secondary inlet 152.

A mixing ratio and a pressure recovery of jet pump 150 depend highly on the geometries of primary flow nozzle 153, contraction tube 154, mixing tube 155, and diffusion tube 156. In certain embodiments, jet pump 150 is optimized based on design conditions that vary for each specific aircraft where a high efficiency pneumatic flow control system is installed. The design conditions include cabin pressure, ambient altitude, engine pressure, and cabin ventilation inflow requirement. Cabin ventilation inflow depends on such factors as passenger loading, for example. In certain embodiments, flow control systems 100, 200 may be up/down-sized depending on expected passenger loading.

High efficiency pneumatic flow control systems 100 and 200 solve the drawbacks of reduced thrust during takeoff due to use of higher pressure bleed air, reduced aircraft range due to use of higher pressure bleed air during cruise, increased cooling requirements due to mixing of high- and low-pressure engine bleed air, and the limitation of using a jet pump with a single secondary flow source, which causes a tradeoff between takeoff performance versus cruise performance.

In operation, the performance of high efficiency pneumatic flow control systems 100 and 200 varies based on ambient altitude, the temperature and pressure of the bleed air, and the required cabin air flow. While the aircraft is at sea level, MSSV 130 supplies ambient air 126 to FCV 140. FCV 140 mixes the maximum amount of ambient air with HP bleed air 124 at a ratio defined by the total required flow. FCV outlet flow 147 is continually monitored by flow sensor 148 to ensure that the required flow is being achieved. By mixing as much ambient air as possible, the temperature exiting FCV 140 is minimized and the cooling required by ECS 110 is reduced. MSSV 130 allows either ambient air 126 or LP bleed air 124 to be selected, or the two to be mixed, thereby enabling optimized bleed air extraction for improving efficiency during both takeoff and cruise phases of flight. Advantages include improved takeoff performance, cruise fuel burn reduction, and reduced cooling-capacity requirements of ECS 110.

Figure 4:
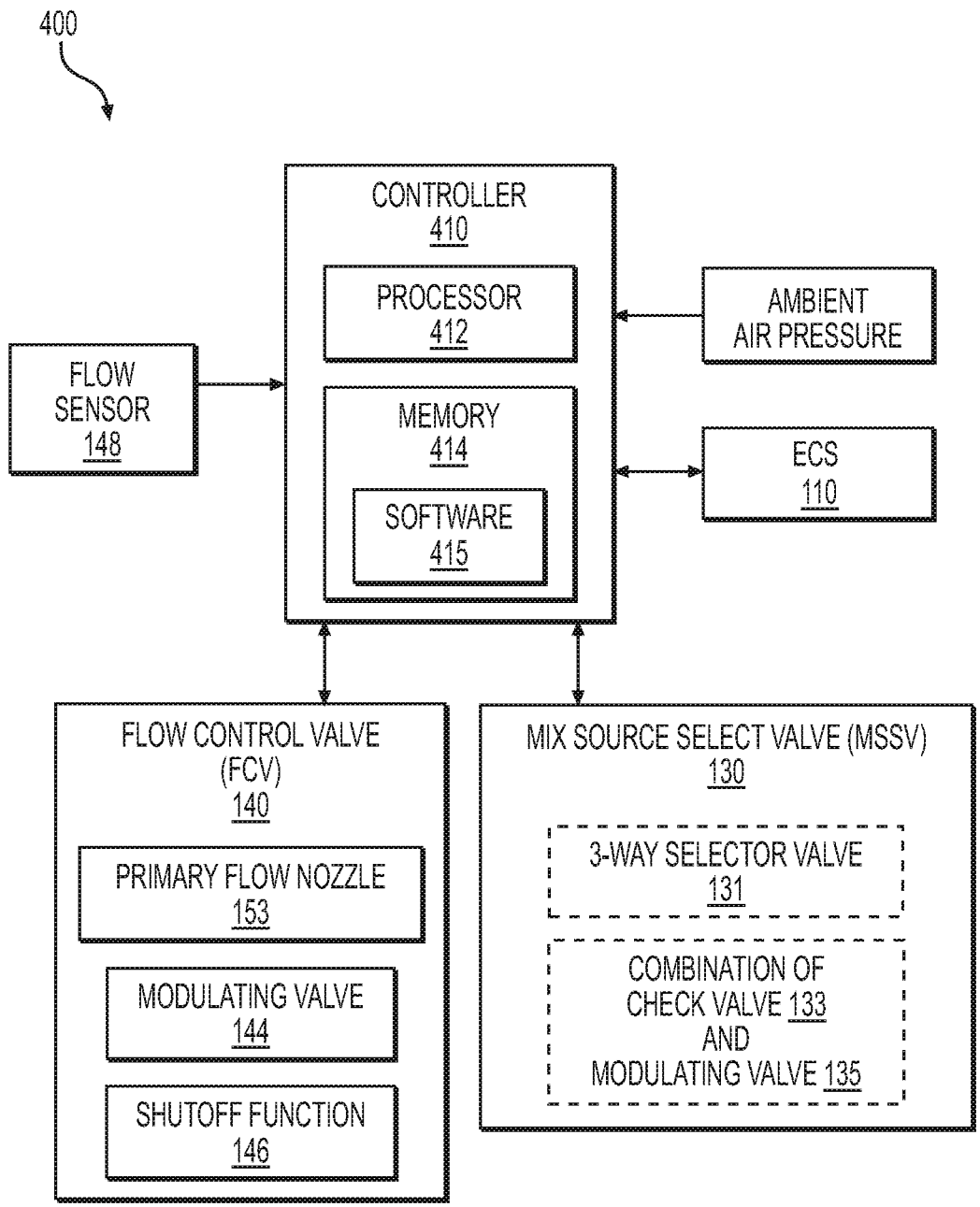
FIG. 4 is a block diagram illustrating a control architecture for controlling components of the systems of FIGS. 1 and 2, in an embodiment.

FIG. 4 shows an exemplary control architecture 400 for controlling air mixing using the high efficiency pneumatic flow control systems 100 and 200. Control architecture 400 includes a controller 410 communicatively coupled to devices of systems 100 and 200. The devices may include components of FCV 140, components of MSSV 130 (including either the three-way selector valve 131 of system 100, or the check valve 133 and modulating valve 135 combination of system 200), flow sensor 148, any ambient air pressure measurement devices (e.g., static ports), and ECS 110. Controller 410 is typically a microcontroller, a microprocessor, or programmable logic controller (PLC), but could also be a computer (e.g., the aircraft flight control computer or a separate computer), having a memory 414, including a non-transitory medium for storing software 415, and a processor 412 for executing instructions of software 415. Memory 414 may be used to store information used by controller 410, including but not limited to algorithms and lookup tables (e.g., air pressure as a function of altitude). In certain embodiments, some or all of software 415 is configured as firmware for providing low-level control of devices of systems 100 and 200. Communication between controller 410 and devices of system 100 or 200 may be by one of a wired and/or wireless communication media.

Controller 410 determines the secondary flow source from MSSV 130 (e.g., ambient air 126 or LP bleed air 124) based on the ambient pressure (e.g., as a function of altitude) as well as the desired mixing ratio of jet pump 150. Controller 410 modulates HP bleed air 122 based on which secondary flow source has been selected, the mixing ratio, and the overall flow required to meet the demands of the cabin (e.g., provided by ECS 110). The quantity of HP bleed air 122 extracted may be adjusted by controller 410 to meet the needs of the aircraft while reducing the bleed air temperature. Switching between ambient air 126 and lower pressure bleed air 124 to optimize the aircraft's takeoff and cruise performance may also be performed by controller 410.

Figure 5:
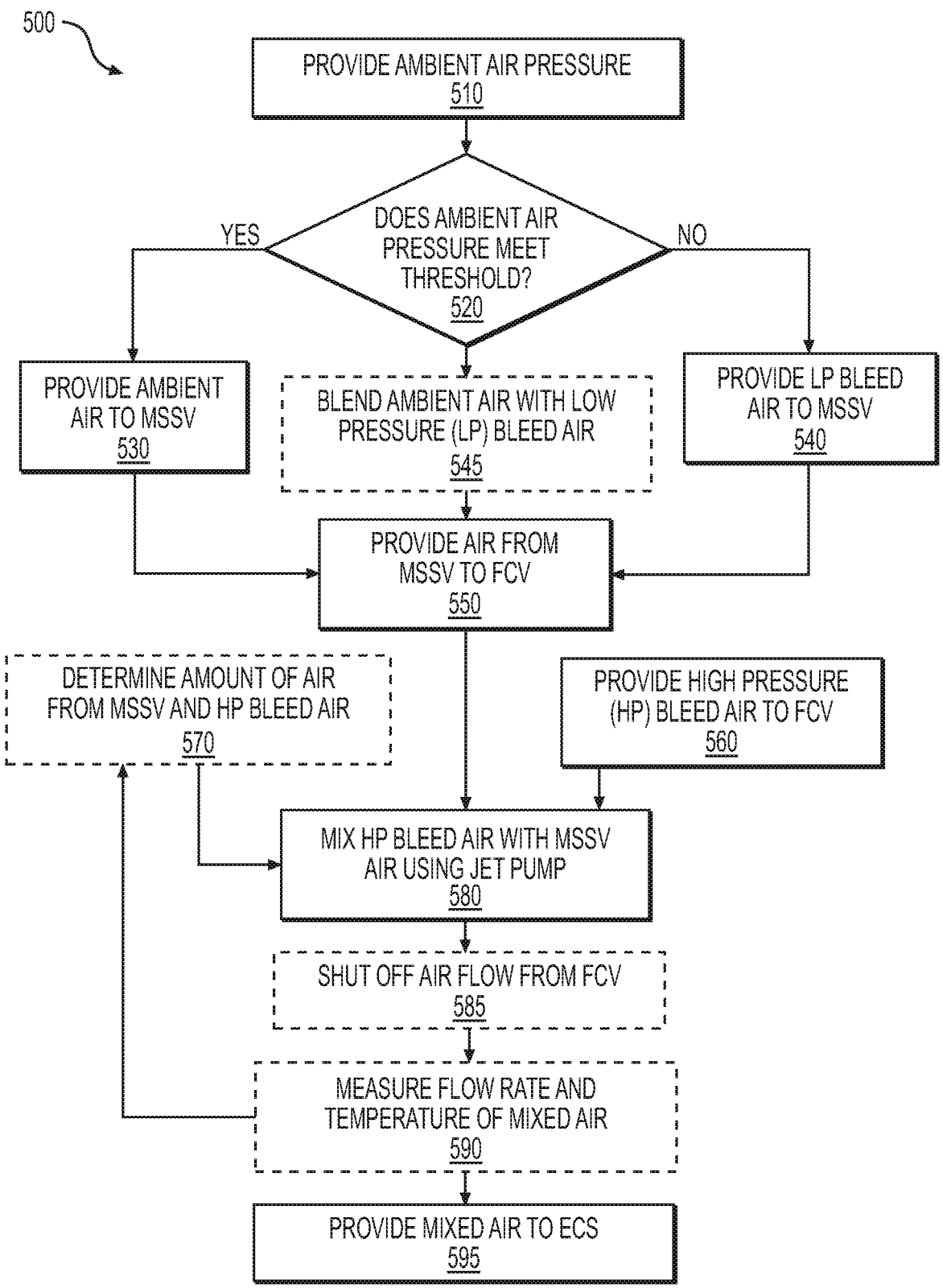
FIG. 5 is a block diagram illustrating a high efficiency pneumatic flow control method performed using the system of FIG. 1 or 2, in an embodiment.

FIG. 5 is a block diagram illustrating an exemplary high efficiency pneumatic flow control method 500 performed using the system of FIG. 1 or FIG. 2.

In a step 510, ambient air pressure is provided. In an example of step 510, ambient air pressure is measured using static ports of a pitot-static subsystem. In another example of step 510, ambient air pressure is derived from a standard lookup table of atmospheric pressure based on altitude. The air pressure value may be provided directly to a controller of the high efficiency pneumatic flow control system (e.g., controller 410), or indirectly via the aircraft's flight control computer or avionics subsystem.

A step 520 is a decision. If in step 520 the ambient air pressure is determined to meet a predetermined threshold, method 500 proceeds with step 530. Otherwise, method 500 proceeds with step 540. In an example of step 520, controller 410 determines if the ambient air pressure provided in step 510 meets a predetermined threshold pressure. The predetermined threshold pressure may be a constant value or a variable value. For example, the predetermined threshold pressure may depend on the requirements of ECS 110 for providing sufficient pressure, ventilation and temperature control for the aircraft cabin.

In a step 530, ambient air is provided to MSSV 130. In an example of step 530, ambient air is received from an aerodynamic inlet and routed to MSSV 130 through three-way selector valve 131 of system 100 under control of controller 410. In an alternative example, ambient air is routed to MSSV 130 through check valve 133 of system 200 with modulating valve 135 commanded to the closed position via controller 410.

In a step 540, LP bleed air is provided to MSSV 130. In an example of step 540, three-way selector valve 131 is commanded by controller 410 to provide LP bleed air 124 from engine 120. In an alternative example, modulating valve 135 is commanded to the open position for providing LP bleed air 124 from engine 120. Check valve 126 closes automatically to stop the flow of ambient air 126 whenever LP bleed air 124 is provided via modulating valve 135 because LP bleed air 124 has a higher pressure than ambient air 126. LP bleed air 124 may have a known pressure based on the engine compression stage used to provide LP bleed air 124 or a measured pressure (e.g., using an in-line pressure gauge between engine 120 and MSSV 130). Additionally, pressure of LP bleed air 124 may vary depending on the aircraft's flight stage (e.g., takeoff or cruise).

In an optional step 545, ambient air is blended with LP bleed air. In an example of step 545, three-way selector valve 131 blends ambient air 126 with LP bleed air 124, rather than using either ambient air 126 (from step 530) or LP bleed air 124 (from step 540). In an embodiment, a venturi ejector is fluidly coupled to an outlet of selector valve 131 to enhance mixing of ambient air 124 with LP bleed air 126.

In a step 550, air is provided to a flow-control valve. In an example of step 550, MSSV 130 provides ambient air 126, LP bleed air 124, or a mix of the two, to FCV 140. Three-way selector valve 131, FIG. 1 may be used to regulate the outlet pressure from MSSV 130 under control of controller 410. Likewise, modulating valve 135, FIG. 2 may be used to regulate the outlet pressure from MSSV 130 under control of controller 410.

In a step 560, HP bleed air is provided from the engine to the flow-control valve. In an example of step 560, modulating valve 135, FIG. 2 opens to allow HP bleed air 122 to pass from engine 120 to FCV 140. HP bleed air 122 may have a known pressure based on the engine compression stage used to provide HP bleed air 122 or a measured pressure (e.g., using an in-line pressure gauge between engine 120 and MSSV 130). Additionally, pressure of HP bleed air 122 may vary depending on the aircraft's flight stage (e.g., takeoff or cruise).

In an optional step 570, amounts of air are determined for mixing. In an example of step 570, controller 410 determines how much air from MSSV 130 to mix with HP bleed air 122. This determination may depend on factors including the pressure and temperature of air from MSSV 130, the pressure and temperature of HP bleed air 122, the phase of flight of the aircraft (e.g., takeoff or cruise), and the desired flow rate, pressure and temperature of mixed air for supplying to ECS 110 (e.g., see step 590).

In a step 580, HP bleed air is mixed with the MSSV air using jet pump 150. An amount of HP bleed air may be regulated using the variable diameter orifice (e.g., ball, butterfly, or gate-type valve) of primary-flow nozzle 153. In an example of step 580, controller 410 controls the diameter of the orifice of primary-flow nozzle 153 for providing a desired amount of HP bleed air 122 based on the determination made in step 570. In another example of step 580, control 410 controls three-way separator valve 131, FIG. 1 or modulating valve 135, FIG. 2 to provide a desired amount of LP bleed air 124 and/or ambient air 126 based on the determination made in step 570.

In an optional step 585, air flow from the flow-control valve is shut off. In an example of step 485, controller 410 may command shut off valve 146 to close, thereby stopping flow of mixed air from FCV 140 to ECS 110.

In an optional step 590, the flow rate and temperature of mixed air are measured. In an example of step 590, the flow rate of mixed air from jet pump 150 is measured using flow sensor 148, and the temperature of the mixed air is measured using a temperature sensing device (not shown), such as a thermocouple or a resistance temperature detector (RTD), for example. Information from flow sensor 148 and the temperature sensing device may be fed back to controller 410 and used to determine the amount of HP bleed air 122 and air from MSSV 130 to supply to FCV 140 for mixing (in step 570).

In a step 595, mixed air is provided to the environmental control system. In an example of step 595, mixed air is provided from FCV 140 to ECS 110 at the desired temperature, pressure, and flow rate.

High efficiency pneumatic flow control method 500 overcomes the drawbacks of reduced thrust during takeoff, reduced aircraft range, increased cooling capacity needed to condition cabin air, and the tradeoff between takeoff performance versus cruise performance.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. A pneumatic flow-control system for an aircraft, comprising:
    an ambient-air inlet for providing ambient air from outside the aircraft;
    a low-pressure source of engine bleed air from a low-compression stage of an engine for providing low-pressure-bleed air;
    a selector valve for selecting ambient air or low-pressure-bleed air to provide low-pressure air;
    a venturi ejector fluidly coupled to the outlet of the selector valve for enhancing mixing of ambient air with low-pressure bleed air;
    a high-pressure source of engine bleed air from a high-compression stage of the aircraft engine for providing high-pressure-bleed air;
    a jet pump adapted to mix high-pressure bleed air with low-pressure air from the venturi ejector for providing a mixed air to an environmental control subsystem;
    a primary inlet of the jet pump for receiving high-pressure-bleed air from the high-pressure source, wherein the primary inlet comprises a variable diameter orifice under control of the controller for throttling high-pressure-bleed air into the jet pump;
    a secondary inlet of the jet pump for receiving low-pressure air from the selector valve; and
    a shutoff function located downstream of the jet pump, the shutoff function adapted to stop flow of the mixed air to the environmental control subsystem.

2. The pneumatic flow-control system of claim 1 further comprising a first modulating valve for modulating an amount of high-pressure bleed air to provide to the primary inlet of the jet pump.

3. The pneumatic flow-control system of claim 1 wherein the selector valve comprises a check valve in combination with a second modulating valve, the check valve being adapted to receive ambient air and the second modulating valve being adapted to receive low-pressure-bleed air.

4. The pneumatic flow-control system of claim 1 further comprising:
    a flow sensor for monitoring a flow rate of the mixed air; and
    a temperature sensor for measuring a temperature of the mixed air.

5. The pneumatic flow-control system of claim 4 further comprising a controller having a non-transitory memory for storing software instructions, and a processor for executing the software instructions, to perform a method for pneumatic flow control comprising:
    receiving an ambient air pressure from a pressure sensor;

receiving a flow rate of the mixed air from the flow sensor;

receiving a temperature of the mixed air from the temperature sensor; and controlling the selector valve and a first modulating valve to control the temperature and pressure of the mixed air based on the ambient air pressure, the temperature of the mixed air, and the flow rate of the mixed air.

6. The pneumatic flow-control system of claim 5 wherein controlling the selector valve and the first modulating valve to control the temperature and pressure of the mixed air is further based on a phase of flight of the aircraft.

7. The pneumatic flow-control system of claim 1 wherein the selector valve is further adapted to provide mixing of ambient air with low-pressure bleed air to provide low-pressure air.

8. A pneumatic flow control method, comprising:

providing a high-pressure bleed air from a high-compression stage of an aircraft engine to a jet pump;

measuring an ambient air pressure to provide an ambient air pressure value to a controller;

determining via the controller if the ambient air pressure value meets a predetermined threshold pressure;

when the ambient air pressure value meets the predetermined threshold pressure:

delivering an ambient air via an inlet of an aircraft; and mixing the ambient air with the low-pressure bleed air via a venturi ejector based on the ambient air pressure value to provide a low-pressure air to the jet pump;

when the ambient air pressure value does not meet the predetermined threshold pressure, delivering a low-pressure bleed air from a low-compression stage of the aircraft engine to provide the low-pressure air to the jet pump;

mixing, with the jet pump, the high-pressure bleed air with the low-pressure air to provide a mixed air;

measuring, with a flow sensor, a flow rate of the mixed air exiting the jet pump; and providing the mixed air to an environmental control subsystem of the aircraft.

9. The pneumatic flow control method of claim 8 further comprising modulating, with a first modulating valve, an amount of the high-pressure bleed air to deliver to the jet pump based on the ambient air pressure and the flow rate of the mixed air.

10. The pneumatic flow control method of claim 8 further comprising measuring a temperature of the mixed air and modulating an amount of the high-pressure bleed air to deliver to the jet pump based on a measured temperature of the mixed air.

11. The pneumatic flow control method of claim 8 wherein delivering the ambient air is via a check valve when the ambient air pressure exceeds a threshold pressure of the check valve.

12. The pneumatic flow control method of claim 8 further comprising modulating, with a second modulating valve, an amount of the low-pressure bleed air to provide to the jet pump.

13. The pneumatic flow control method of claim 8 further comprising:

determining, using the controller, an amount of the high-pressure bleed air and an amount of the low-pressure air to provide to the jet pump;

the controller having a non-transitory memory for storing software instructions, and a processor for executing the software instructions, wherein the step of determining is based on one or more of:

the phase of flight of the aircraft;

the desired and measured flow rates of the mixed air; and the pressure and temperature of the high-pressure bleed air, the low-pressure bleed air, the ambient air, and the mixed air.

14. The pneumatic flow control method of claim 13 wherein the primary inlet further comprises a variable diameter orifice under control of the controller for throttling high-pressure-bleed air into the jet pump.

15. The pneumatic flow control method of claim 13 further comprising:

determining, using the controller, a maximum amount of the ambient air and a minimum amount of the low-pressure bleed air to provide when the ambient air pressure meets the predetermined threshold pressure; and providing a sufficient flow of the mixed air based on the measured flow rate, thereby minimizing the temperature of the mixed air for reducing a cooling requirement of the environmental control subsystem.

16. The pneumatic flow control method of claim 13 further comprising:

optimizing, using the controller, blending of the high-pressure bleed air, the low-pressure bleed air, and the ambient air for improving takeoff performance and cruise fuel burn.

17. A pneumatic flow-control system for an aircraft, comprising:

an ambient-air inlet for providing ambient air from outside the aircraft;

a low-pressure source of engine bleed air from a low-compression stage of an engine for providing low-pressure-bleed air;

an ambient air pressure value provided to a controller;

a three-way selector valve, actuated under control of the controller, to provide low-pressure air based on the ambient air pressure value, by selecting one of a) ambient air, b) low-pressure-bleed air, or c) a mixture of ambient air and low-pressure-bleed air;

a venturi ejector fluidly coupled to the outlet of the three-way selector valve for enhancing mixing of ambient air with low-pressure bleed air;

a high-pressure source of engine bleed air from a high-compression stage of the aircraft engine for providing high-pressure-bleed air;

a jet pump having a primary inlet for receiving high-pressure-bleed air from the high-pressure source and a secondary inlet for receiving low-pressure air from the venturi ejector, wherein the jet pump is adapted to mix high-pressure bleed air with low-pressure air for providing a mixed air to an environmental control subsystem.

* * * * *